(12) United States Patent
Acharya et al.

(10) Patent No.: US 7,813,270 B2
(45) Date of Patent: Oct. 12, 2010

(54) ROUTE PRECOMPUTATION METHOD AND APPARATUS FOR BANDWIDTH GUARANTEED TRAFFIC

(75) Inventors: Swarup Acharya, New Providence, NJ (US); Bhawna Gupta, Edison, NJ (US); Pankaj Risbood, Roselle, NJ (US); Anurag Srivastava, Roselle, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2436 days.

(21) Appl. No.: 10/438,431

(22) Filed: May 15, 2003

(65) Prior Publication Data

US 2004/0228323 A1   Nov. 18, 2004

(51) Int. Cl.
*H04J 1/16* (2006.01)
(52) U.S. Cl. .................. 370/225; 370/238; 370/252
(58) Field of Classification Search ............. 370/238, 370/255, 351, 400; 701/119; 340/934; 709/241
See application file for complete search history.

(56) References Cited

U.S. PATENT DOCUMENTS

2003/0227877 A1*  12/2003  Kar et al. ................... 370/252

OTHER PUBLICATIONS

E.W. Dijkstra, "A Note on Two Problems in Connection with Graphs," Numerische Mathematik 1, pp. 269-271, 1959.
E.L. Lawler, "A Procedure for Computing the K Best Solutions to Discrete Optimization Problems and its Application to the Shortest Path Problem," Management Science, vol. 18, pp. 401-405, Mar. 1972.
S.-W. Lee et al., "A K-Best Paths Algorithm for Highly Reliable Communication Networks," IEICE Trans. Communications, pp. 586-590, 1999.
S.D. Nikolopoulos et al., "Addressing Network Survivability Issues by Finding the K-best Paths Through a Trellis Graph," Proc. of IEEE Infocom, pp. 1-8, 1997.
A. Shaikh et al., "Efficient Precomputation of Quality-of-Service Routes," Proc. Workshop on Network and Operating Systems Support for Digital Audio and Video, 16 pages, Jul. 1998.
A. Orda et al., "QoS Routing: The Precomputation Perspective," Proc. of IEEE Infocom, 9 pages, 1999.
M. Peyravian et al., "Network Path Caching: Issues, Algorithms and a Simulation Study," Computer Communications, 20(8), pp. 605-614, Aug. 1997.

(Continued)

*Primary Examiner*—Donald L Mills
*Assistant Examiner*—Wanda Z Russell
(74) *Attorney, Agent, or Firm*—Ryan, Mason & Lewis, LLP

(57) ABSTRACT

A maximum-flow based route precomputation algorithm includes at least a route generation phase and a route selection phase, and determines one or more routes between at least a given pair of nodes in a network. In the route generation phase, a maximum-flow algorithm is applied to a first set of information characterizing links between the given pair of nodes in the network. The output of the maximum-flow algorithm is utilizable to generate a second set of information characterizing corresponding admissible flows. In the route selection phase, one or more routes are determined based on the second set of information using, for example, a shortest widest path (SWP) algorithm. The route generation and route selection phases may be repeated for each of a plurality of node pairs of the network.

20 Claims, 5 Drawing Sheets

OTHER PUBLICATIONS

M. Kodialam et al., "Minimum Interference Routing of Bandwidth Guaranteed Tunnels with MPLS Traffic Engineering Applications," Proc. of IEEE Infocom, pp. 1-16, 2000.

S. Suri et al. "Profile-Based Routing: A New Frame work for MPLS Traffic Engineering," Proc. of. QofIS, pp. 1-2, 2001.

D. Awduche et al., "Extensions to RSVP for LSP Tunnels," RFC3209, pp. 1-3, Dec. 2001.

L. Andersson et al., "Label Distribution Protocol Specification," RFC3036, pp. 1-17, Jan. 2001.

Z. Wang et al., "Quality-of-Service Routing for Supporting Multimedia Applications," IEEE Journal on Selected Areas in Comm., vol. 14, No. 7, pp. 1228-1234, Sep. 1996.

A.V. Goldberg et al., "A New Approach to the Maximum-Flow Problem," Journal of the Association for Computing Machinery, vol. 35, No. 4, pp. 921-940, Oct. 1988.

S. Acharya et al., "Architecting Self-Tuning Optical Networks," Proceedings of the European Conference of Optical Communications, 2 pages, Sep. 2002.

D. Katz et al., "Traffic Engineering Extensions to OSPF Version 2," Network Working Group, IETF, pp. 1-14, Oct. 2002.

D.H. Lorenz et al., "QoS Routing in Networks with Uncertain Parameters," IEEE/ACM Transactions on Networking, vol. 6, No. 6, 8 pages, Dec. 1998.

\* cited by examiner

INPUT:
10 — Given a graph G(V,E) with residual link capacities and a set of ingress-egress pairs S.

OUTPUT:
12 — k paths along with the permissible bandwidth for each ingress-egress pair (s,d) ∈ S

ALGORITHM:
For each ingress-egress pair (s,d) ∈ S do the following:

14A — Compute maximum flow from s to d.
Generate the admissible flow graph F by setting the edge capacities to flow values of the maxflow computation.

14B — For i in 1 ... k
Find the shortest widest path $P_i$ using SWP in F.
Compute the available bandwidth $f(P_j)$ of path $P_j$. This is its permissible bandwidth.
Lower the residual capacities of the edges in $P_j$ by $f(P_j)$.

ROUTE PRECOMPUTATION METHOD AND APPARATUS FOR BANDWIDTH GUARANTEED TRAFFIC

FIELD OF THE INVENTION

The present invention relates generally to techniques for determining appropriate routes for transmission of data through a network, and more particularly to techniques involving precomputation of routes for bandwidth guaranteed data traffic, such as that commonly associated with video, voice or other real-time applications, as well as other types of data traffic.

BACKGROUND OF THE INVENTION

Precomputation in the data transmission context refers generally to the process of computing a set of end-to-end routes through a network prior to the arrival of data transmission requests. A route is also commonly referred to as a path, and the terms are typically used interchangeably. When a new request arrives, the particular route that best matches the bandwidth requirements of the request is chosen from the precomputed set. This "offline" routing process is in contrast to "online" routing, also known as on-demand routing, where routes are computed upon the arrival of the corresponding requests.

Conventional precomputation techniques are generally based on the same hop-minimization algorithms that are commonly used in online routing. These include shortest-path algorithms such as the Dijkstra algorithm described in E. W. Dijkstra, "A Note on Two Problems in Connection with Graphs," Numerische Mathematik 1, pp. 269-271, 1959, and the K-shortest path (KSP) algorithm described in E. L. Lawler, "A Procedure for Computing the K Best Solutions to Discrete Optimization Problems and its Application to the Shortest Path Problem," Management Science, Vol. 18, pp. 401405, March 1972. An extension of shortest-path known as widest-shortest path is described in R. Guerin et al., "QoS Routing Mechanisms and OSPF Extensions," Proc. of Globecom 1997. Another precomputation approach involves choosing routes which are as diverse as possible, for example, vertex or edge disjoint, and have the lowest total cost. This approach is referred to as the K-best paths algorithm, and is described in S.-W. Lee et al., "A K-best paths algorithm for highly reliable communication networks," IEICE Trans. Communications, 1999, and S. D. Nikolopoulos et al., "Addressing Network Survivability Issues by Finding the K-best Paths Through a Trellis Graph," Proc. of IEEE Infocom, 1997.

A number of techniques have also been developed which attempt to reduce the storage and computational complexity of the precomputation process. These techniques are generally directed to lowering the cost of computing hop-minimization routes. For example, an enhancement to the Dijkstra algorithm to permit computation of multiple equal-cost routes for each destination is described in A. Shaikh et al., "Efficient Precomputation of Quality-of-Service Routes," Proc. Workshop on Network and Operating Systems Support for Digital Audio and Video, pp. 15-27, July 1998. A variation of a Bellman-Ford algorithm suitable for use in precomputing routes for different hop counts is described in A. Orda et al., "QoS Routing: The Precomputation Perspective," Proc. of IEEE Infocom, 1999. Techniques for determining which specific routes to cache in order to lower storage overhead is described in M. Peyravian et al., "Network Path Caching: Issues, Algorithms and a Simulation Study," Computer Communications, 20(8), pp. 605-614, August 1997.

A significant problem with conventional precomputation techniques such as those mentioned above is that these techniques are based upon an assumption that the hop-minimization algorithms that provide acceptable performance in online routing are equally valid in the precomputation setting. However, the use of hop-minimization algorithms for precomputation can increase network bottlenecks or otherwise lead to poor routing decisions, thereby reducing network capacity utilization, particularly for applications involving bandwidth guaranteed traffic.

Other algorithms have been developed which attempt to avoid the above-described bottleneck problem associated with hop-minimization approaches. Examples of such algorithms include the MIRA algorithm and modified MIRA algorithm as described in M. Kodialam et al, "Minimum Interference Routing with Applications to MPLS Traffic Engineering," Proc. of IEEE Infocom, 2000, and S. Suri et al. "Profile-Based Routing: A New Frame work for MPLS Traffic Engineering," Proc. of QofIS, 2001, respectively. However, these techniques have a number of drawbacks that limit their applicability in general and for precomputation in particular. For example, these techniques generally rely on avoiding specific links in a network, but this approach is counterproductive for precomputation. More specifically, precomputing routes on a network that is weighted to discourage use of specific links can lead to poor network utilization since many of these links may never feature in any of the materialized routes. This can impose serious penalties in precomputation.

A need therefore exists for an improved route precomputation approach which can avoid the bottleneck and network utilization problems associated with hop-minimization algorithms while also providing higher quality routes and enhanced efficiency relative to the above-described conventional techniques.

SUMMARY OF THE INVENTION

The present invention provides improved techniques for route precomputation. The techniques are particularly well-suited for use with bandwidth guaranteed traffic, but can also be used with other types of data traffic.

In accordance with one aspect of the invention, a maximum-flow based route precomputation algorithm is provided that includes a route generation phase and a route selection phase, and is configured to determine one or more routes between at least a given pair of nodes in a network. The given pair of nodes may comprise source and destination nodes of an ingress-egress node pair, or any other node pair in the network.

In the route generation phase, a maximum-flow algorithm is applied to a first set of information characterizing links between the given pair of nodes in the network. The first set of information may be representable as a graph comprising vertices corresponding to network nodes and edges corresponding to links between the nodes. A maximum flow from a first one of the given pair of nodes to a second one of the given pair of nodes may be computed utilizing the maximum-flow algorithm.

The output of the maximum-flow algorithm is utilizable to generate a second set of information characterizing corresponding admissible flows. For example, the second set of information may comprise an admissible flow graph configured such that any route therethrough will not cause flow constriction. Such an admissible flow graph may be generated from the computed maximum flow by setting edge capacities in a corresponding network graph to flow values determined from the computed maximum flow.

In the route selection phase, one or more routes are determined based on the second set of information using a shortest widest path (SWP) algorithm or other routing algorithm. For example, a designated maximum number k of routes that are incrementally consistent with one another may be determined.

The route generation and route selection phases may be repeated for each of a plurality of node pairs of the network.

In accordance with another aspect of the invention, the maximum-flow based precomputation algorithm is configured such that a set of k+i generated routes has substantially the same route quality regardless of whether the routes are generated collectively as k+i routes or the routes are generated by first generating k routes and subsequently generating i additional routes.

In an illustrative embodiment, the route generation phase and the route selection phase are each implemented as corresponding offline phases of a multiple-phase precomputation algorithm. The multiple-phase precomputation algorithm may also include an additional online route selection phase in which, for example, one of a number of routes determined in the offline route selection phase is selected for use in satisfying a particular traffic demand.

Advantageously, the maximum-flow based precomputation algorithm of the illustrative embodiment exhibits the property of flow scalability, that is, the algorithm does not disproportionately improve the current routing performance at the expense of lowering the future routing potential. It can outperform conventional algorithms such as the above-noted KSP and modified MIRA algorithms in terms of important performance parameters, including number of requests rejected, fraction of bandwidth routed and total flow captured in the precomputed routes. In addition, the maximum-flow based algorithm of the illustrative embodiment can preserve route quality even in applications in which the routes are precomputed incrementally.

BRIEF DESCRIPTION OF THE DRAWINGS

FIG. 2 shows an exemplary maximum-flow based precomputation algorithm in accordance with an illustrative embodiment of the invention.

DETAILED DESCRIPTION OF THE INVENTION

Figure 1A:
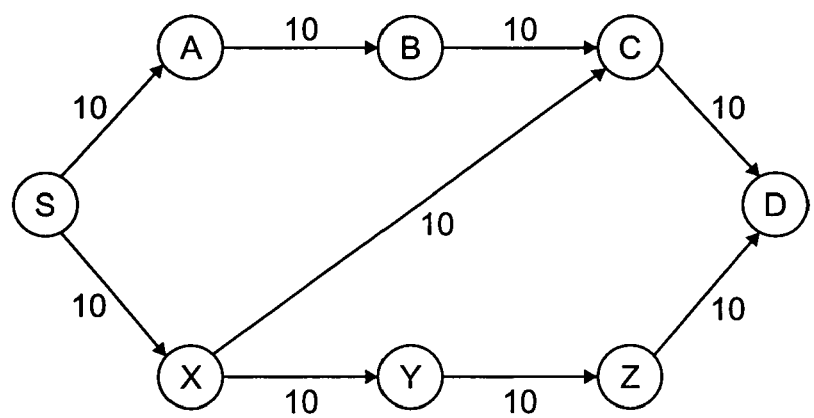
FIGS. 1A, 1B and 1C are simplified network diagrams used to illustrate certain aspects of the invention.

The invention will be illustrated herein in conjunction with an illustrative embodiment of a route precomputation algorithm and an associated network-based system and example network nodes in which the algorithm is implemented. It should be understood, however, that the invention is not limited to use with the particular precomputation algorithm and network-based system or network node implementations described, but is instead more generally applicable to any routing application in which it is desirable to provide improved precomputation performance.

As noted above, conventional precomputation techniques generally utilize the same hop-minimization algorithms that have been found effective in online routing. This has led to problems such as bottlenecks and underutilization of network capacity.

We have determined that route precomputation, unlike online routing, is intolerant to a poor choice of a route generation algorithm. Since route precomputation generally works with a limited set of routes, materializing routes that create bottlenecks can fundamentally limit the efficacy of the route precomputation process.

The present invention in the illustrative embodiment to be described below in conjunction with FIG. 2 provides an improved precomputation approach which is based in part on a maximum-flow algorithm. We have determined that the maximum-flow based precomputation algorithm of the illustrative embodiment outperforms conventional algorithms such as the above-noted KSP and modified MIRA algorithms for metrics such as number of requests rejected, fraction of bandwidth routed and total flow captured in the precomputed routes. Moreover, the maximum-flow based algorithm of the illustrative embodiment can preserve route quality even in applications in which the routes are precomputed incrementally, thus making it well-suited for numerous practical implementations.

The illustrative embodiment is configured to improve the quality of precomputed routes for bandwidth guaranteed traffic by determining, for a given ingress-egress node pair in a network and a limited storage space able to store a maximum of k materialized routes, the particular routes which should be precomputed. It is to be appreciated, however, that the present invention, although particularly well-suited for bandwidth guaranteed traffic, is more generally applicable to any type of data traffic.

A number of assumptions are made in the description of the illustrative embodiment, but it should be understood that these and other assumptions made herein are not requirements of the invention, and the assumptions need not apply in other embodiments.

For example, the precomputation approach in the illustrative embodiment is assumed to be implemented in a centralized manner, in which a centralized server or other type of central controller precomputes and stores the routes. However, the invention can also be implemented in a distributed manner, with the route precomputation and storage operations being distributed across multiple network nodes, as will be readily apparent to those skilled in the art.

It is also assumed for the illustrative embodiment that there is no a priori knowledge about ingress-egress pairs of the network. However, if this information is determinable from network topology or otherwise available, it may be used to reduce the computational overhead by limiting precomputation to only the appropriate pairs. Absent such information, all potential pairs may be considered.

It is further assumed that a reasonably up-to-date network topology is available at route computation time. This information may be obtainable in certain applications from routing protocols such as OSPF-TE, described in Katz et al. "Traffic Engineering Extensions to OSPF," Internet Draft, Network Working Group, IETF. It is generally desirable to maintain consistency between the topology and the current network state even after the routes are computed. This ensures that a route selection phase of the maximum-flow based precomputation algorithm, used to verify the available bandwidth on a route as will be described in conjunction with FIG. 2, is accurate without relying on additional signaling overhead.

The illustrative embodiment will be described in the context of a multi-protocol label switched (MPLS) data network, although the invention is applicable to any bandwidth guaranteed routing domain, and more generally to any data traffic routing application.

MPLS networks provide the flexibility to control the routing through explicit label switched paths (LSPs), which are signaled using protocols such as RSVP-TE or LDP, as described in D. Awduche et al., "Extensions to RSVP for LSP Tunnels," RFC3209, December 2001, and L. Andersson et al., "Label Distribution Protocol Specification," RFC3036, January 2001, respectively. An LSP setup request is defined by a tuple $(s_i, d_i, b_i)$ where $s_i$ and $d_i$ refer to ingress and egress nodes, respectively, and $b_i$ is the bandwidth required by this LSP. Although a given connection request may pose various QoS constraints, it is assumed that the request can be mapped into an equivalent bandwidth constraint. Requests may be accepted or rejected based on conventional admission control policies to avoid creating bottlenecks and low network utilization conditions. No assumptions are made regarding the arrival pattern of individual requests or their bandwidth requirements.

With reference now to FIG. 1A, consider by way of example the problem of routing traffic between nodes S and D in the network shown. All the edges have unit cost and capacity of 10 units. Since the maximum-flow value for the S-D pair is 20 units, an ideal algorithm should be able to route that much flow between them.

A conventional hop-minimization algorithm would generally choose path S-X-C-D as the first path for routing traffic. However, by selecting this route, the algorithm has created an artificial bottleneck which prevents it from routing any more flows, thereby restricting the end-to-end throughput between S and D to just 10 units.

In this example, by instead routing the demands via the routes S-A-B-C-D and S-X-Y-Z-D, one can route up to 20 units. Links such as link X-C in FIG. 1A thus cause a phenomenon referred to herein as "flow constriction," which may be formally defined as follows.

In a network with finite edge capacities, the total amount of the flow that can be routed between any two nodes is bounded by the maximum-flow value between them. Hence, the process of routing traffic will always reduce the maximum-flow value in the residual network between the source and destination nodes. However, the amount of reduction in the maximum-flow value can be unanticipated and disproportionately high at times. As noted above, the maximum-flow value between S and D is 20 units, but routing 10 units on route S-X-C-D reduces the maximum-flow value to zero. We denote this unanticipated reduction in the maximum-flow value as flow constriction.

More specifically, let X be the maximum-flow value for a source-destination pair. Routing a traffic demand of bandwidth B along route or path P will cause flow constriction if it reduces the maximum-flow value in the residual network below X-B. The maximum-flow based algorithm of the illustrative embodiment advantageously minimizes or otherwise alleviates this flow constriction effect.

Another advantageous feature of the maximum-flow based algorithm of the illustrative embodiment is that it exhibits a property referred to herein as "flow scalability." An algorithm is flow scalable if it meets the flow constriction property for any value of k. The flow scalability property thus ensures that the algorithm does not disproportionately improve the current routing performance at the expense of lowering the future routing potential. A conventional hop-minimization algorithm that provides S-X-C-D as the first route in the FIG. 1A example fails to meet this property since it leaves no potential for routing any further requests in the residual network even though capacity existed in the original network.

The term "admissible flow" with respect to a given link will be used herein to refer to the maximum amount of traffic that can be routed on that link without creating flow constriction. In the FIG. 1A example, the admissible flow value for link X-C is zero and the admissible flow value for each of the other links is 10 units. Thus, any traffic routed through link X-C would reduce the overall routable flow. If the admissible flow values for all the links in the network are known, one can easily determine if routing a demand along a route will create flow constriction. Exemplary techniques for determining the admissible flow value for each link will be described in greater detail below.

The term "yield" with respect to a given set of routes will be used herein to refer to the total amount of flow that can be routed through those routes. The yield captures the constriction among different routes and thus is not simply a sum of individual flows. In the FIG. 1A example, the yield of the routes S-A-B-C-D (flow 10) and S-X-C-D (flow 10) is 10 units whereas the yield of routes S-A-B-C-D (flow 10) and S-X-Y-Z-D (flow 10) is 20 since the latter pair of routes are disjoint. It is generally desirable for the maximum-flow based precomputation algorithm to choose a set of routes that have a very high yield in order to avoid request rejections. Since the yield is bounded by the maximum-flow value between the source-destination pair, the algorithm should aim to raise its yield to that value.

Figure 1B:
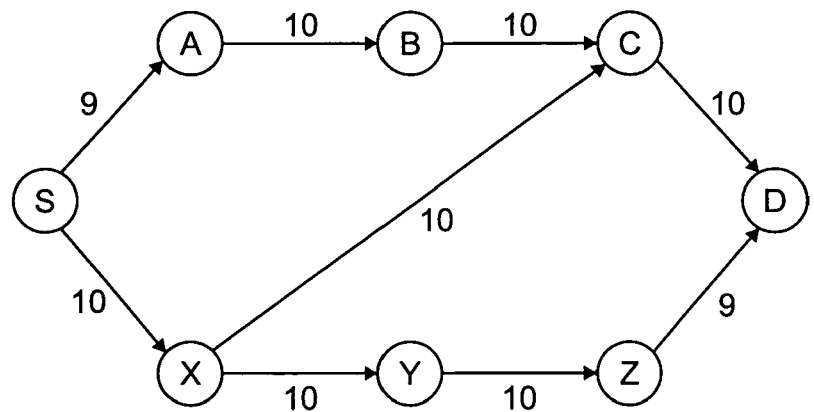

In the illustrative embodiment, each materialized route is stored along with the permissible bandwidth that can be routed along the route. With reference now to FIG. 1B, the example network shown is similar to that of the previous example, but with slightly different edge capacities as indicated. As before, there are three routes from S to D, namely, S-A-B-C-D, S-X-Y-Z-D and S-X-C-D, each able to route up to 9, 9 and 10 units, respectively. Note that the maximum-flow value between S and D is 19. However, this flow is achievable only if the route S-X-C-D were limited to route only 1 unit of flow. Hence, the permissible bandwidths for the three routes are 9, 9 and 1 respectively.

FIG. 2 shows the input 10, output 12 and algorithm steps 14 of the maximum-flow based precomputation algorithm of the illustrative embodiment. This algorithm is advantageously configured to generate routes that provide a very high yield, while also preserving the above-described flow scalability property.

The input 10 in this embodiment comprises information characterizing a graph G(V, E), where V and E denote vertices and edges, respectively, and a set of ingress-egress pairs S.

The output 12 in this embodiment comprises kroutes or paths along with the permissible bandwidth for each ingress-egress pair (s, d) in S.

The example algorithm 14 operates in at least two phases, namely, a route generation phase 14A which determines admissible flow information and a route selection phase 14B which utilizes the admissible flow information to materialize k routes.

The phases 14A and 14B are preferably each implemented as corresponding offline phases, although this is not a requirement of the invention.

It should be noted that the algorithm 14 may also include an online route selection phase in which, for example, one of the k routes determined in the offline route selection phase 14B is selected for use in satisfying a particular traffic demand. Such a phase is invoked upon arrival of the demand. As a more particular example, this online route selection phase may simply select the first of the k routes which has a permissible bandwidth greater than the required bandwidth of the traffic demand.

The online route selection phase is not explicitly shown in FIG. 2, and may be considered part of the precomputation algorithm or separate from that algorithm. Other types of phases may also or alternatively be used, as will be appreciated by those skilled in the art.

In the route generation phase 14A, the maximum-flow value between the pair (s, d) is first calculated. Along with the maximum-flow value, the amount of flow on each edge is also provided. Note that this edge flow value is the maximum amount of traffic that can be routed on the edge without creating flow constriction and thus, the value of the admissible flow for the link. Consequently, we create a new graph of the network with the capacity of every link reduced to the admissible flow and call this graph the admissible flow graph F.

Figure 1C:
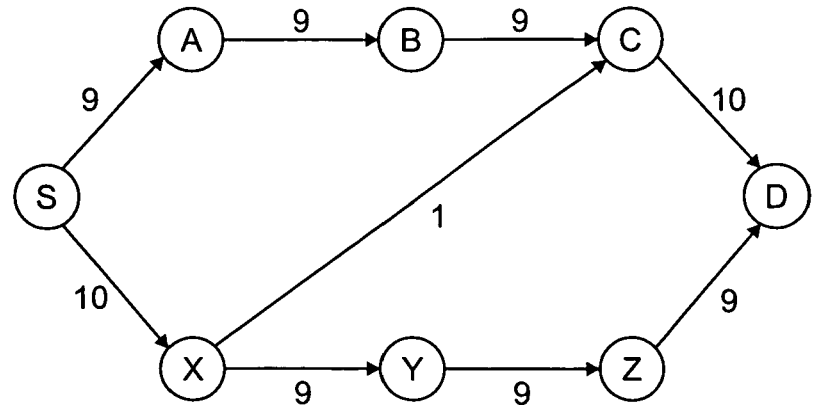

FIG. 1C shows the admissible flow graph for the example previously described in conjunction with FIG. 1B, as determined in accordance with the illustrative maximum flow-based precomputation algorithm of FIG. 2.

Using the admissible flow graph for route computation provides an important advantage in that any route on this graph does not cause flow constriction. Moreover, the flow available on any route without causing any constriction can be determined in a straightforward manner. For example in FIG. 1B, the flows on each of the three possible routes S-A-B-C-D, S-X-Y-Z-D and S-X-C-D are 9, 9 and 1 respectively. Thus, determining the set of precomputed routes reduces to determining the specific routes to be materialized such that the yield is maximized and the flow scalability property is maintained.

This determination is made in the route selection phase 14B of the FIG. 2 algorithm by applying a conventional shortest widest path (SWP) algorithm to the admissible flow graph F. The SWP algorithm is described in greater detail in, for example, Z. Wang et al., "QoS routing for supporting resource reservation," IEEE Journal on Selected Areas in Comm., Vol. 14(7), pp. 1228-1234, September 1996. Multiple invocations of the SWP algorithm in the route selection phase 14B compute routes in decreasing order of their available bandwidth. After the computation of each route, the bandwidth of each link along the route is reduced by the value of the flow. This process is repeated until all routes are generated. Since the order in which the SWP algorithm chooses the routes is independent of k, the generated routes are incrementally consistent. Moreover, the flow scalability property is maintained because the SWP algorithm operates only on the admissible flow graph F.

It should be noted that the use of the SWP algorithm in the example maximum-flow based precomputation algorithm of FIG. 2 does not lead to the bottleneck and low network utilization problems commonly associated with a hop-minimization algorithm such as SWP. This is because the SWP algorithm in the context of FIG. 2 operates on the admissible flow graph as generated by the route generation phase 14A rather than the original graph G characterizing the actual network topology.

Another advantage of the maximum-flow based precomputation algorithm of FIG. 2 is that, since the algorithm preserves the flow scalability property, the set of routes generated if k+i routes were required would have the same quality as the routes generated if k routes were precomputed, followed by an additional request for i routes later. This property holds for all values of k. Consequently, the network operator does not need to determine initially the particular number of routes to be materialized, but can instead incrementally compute the routes as required. Thus, the maximum-flow based precomputation algorithm in the illustrative embodiment incurs only very low upfront costs for storage and computation.

The illustrative embodiment attempts to minimize the effect of flow constriction among various routes for a given source-destination pair and attempts to choose routes with high yields. However, it does not take into account the flow constriction on its routes from the traffic of other ingress-egress pairs. We have determined that, although this global flow constriction effect can make a qualitative difference in routing performance, its impact is limited in most practical applications. In fact, it can be shown that the maximum-flow based algorithm of the illustrative embodiment outperforms conventional algorithms which attempt to account for similar effects in their routing processes.

The above-noted online route selection phase of the FIG. 2 algorithm may be viewed as solving a matching problem in that it determines the route that will be used to satisfy the bandwidth demand. If the bandwidth requirement of the demand is significantly smaller than the permissible bandwidth of the materialized routes, a first fit solution will provide reasonable performance. This is likely to be the case in practical networks since the LSP sizes are typically much smaller than link capacities. However, if the bandwidth requirements of the demands and the link capacities are comparable, there can be a potential for bandwidth fragmentation. Moreover, it may be possible for a request to be satisfied on the network but exceed the permissible bandwidth of all the materialized routes. Accepting such a demand has the potential to create flow constriction, thereby increasing the rejection rate in the future. These decisions, although important to the overall performance of a network system, can be readily handled using conventional admission control techniques of a type well-known to those skilled in the art.

The route generation phase 14A of the FIG. 2 algorithm performs one maximum-flow computation for each source-destination pair. Any of a number of known maximum-flow techniques, of varying complexity, may be used to perform this computation. For example, the Tarjan-Goldberg algorithm described in A. V. Goldberg et al., "A New Approach to the Maximum Flow Problem," Proc. of the 18th ACM Symposium on the Theory of Computing, pp. 136-146, 1986, has a complexity on the order of $n^2 \sqrt{m}$ and the Ahuja-Orlin algorithm described in R. K. Ahuja et al., "Network Flows: Theory, Algorithms, and Applications," Prentice Hall, 1993, has complexity on the order of $nm+n^2 \log U$, where n is the number of nodes, m is the number of edges and U is an integer bounding the maximum edge capacity. Other maximum-flow algorithms suitable for use in the route generation phase 14A of the FIG. 2 algorithm are described in the above-cited R. K. Ahuja et al. reference.

The complexity of the SWP algorithm in the route generation phase 14B is on the order of mlog(n) for each path. The route generation phase has a worst case running time on the order of km for each incoming LSP request. Thus, beyond the maximum-flow computation, the complexity of the maximum-flow based precomputation algorithm of FIG. 2 is substantially the same as that of any conventional hop-minimization algorithm such as the Dijkstra shortest-path algorithm.

Simulations of the FIG. 2 algorithm were performed on an example 40-node network with 100 links. The links were bi-directional with capacities of either 1 Gigabit/second, 2.5 Gigabits/second or 10 Gigabits/second, so as to model Gigabit Ethernet, OC-48 or OC-192 data traffic, respectively. All traffic demands had the same required bandwidth of 0.2 gigabits/second. Two different request patterns were examined, including an "all pairs" case in which demands across all 1560 ingress-egress pairs was considered, and a "small pairs" case in which 50 node pairs are randomly selected and bandwidth demands are made only across the selected pairs.

The simulation results indicated that the maximum-flow based precomputation algorithm outperforms conventional algorithms such as KSP and modified MIRA for a number of different performance metrics including number of requests rejected, fraction of bandwidth routed and total flow captured in the precomputed routes.

It was also found that a suitable value of k in the simulations was about 10, significantly less than the value required by the conventional KSP algorithm. More specifically, the simulations indicated that the FIG. 2 algorithm using a value of k=10 captured more flow than the KSP algorithm did using a value of k=35 under the same conditions.

As indicated above, a maximum-flow precomputation algorithm in accordance with the present invention can be implemented in a centralized or a distributed manner. Exemplary network and network node implementations of the invention will now be described with reference to FIGS. 3, 4 and 5.

Figure 3:
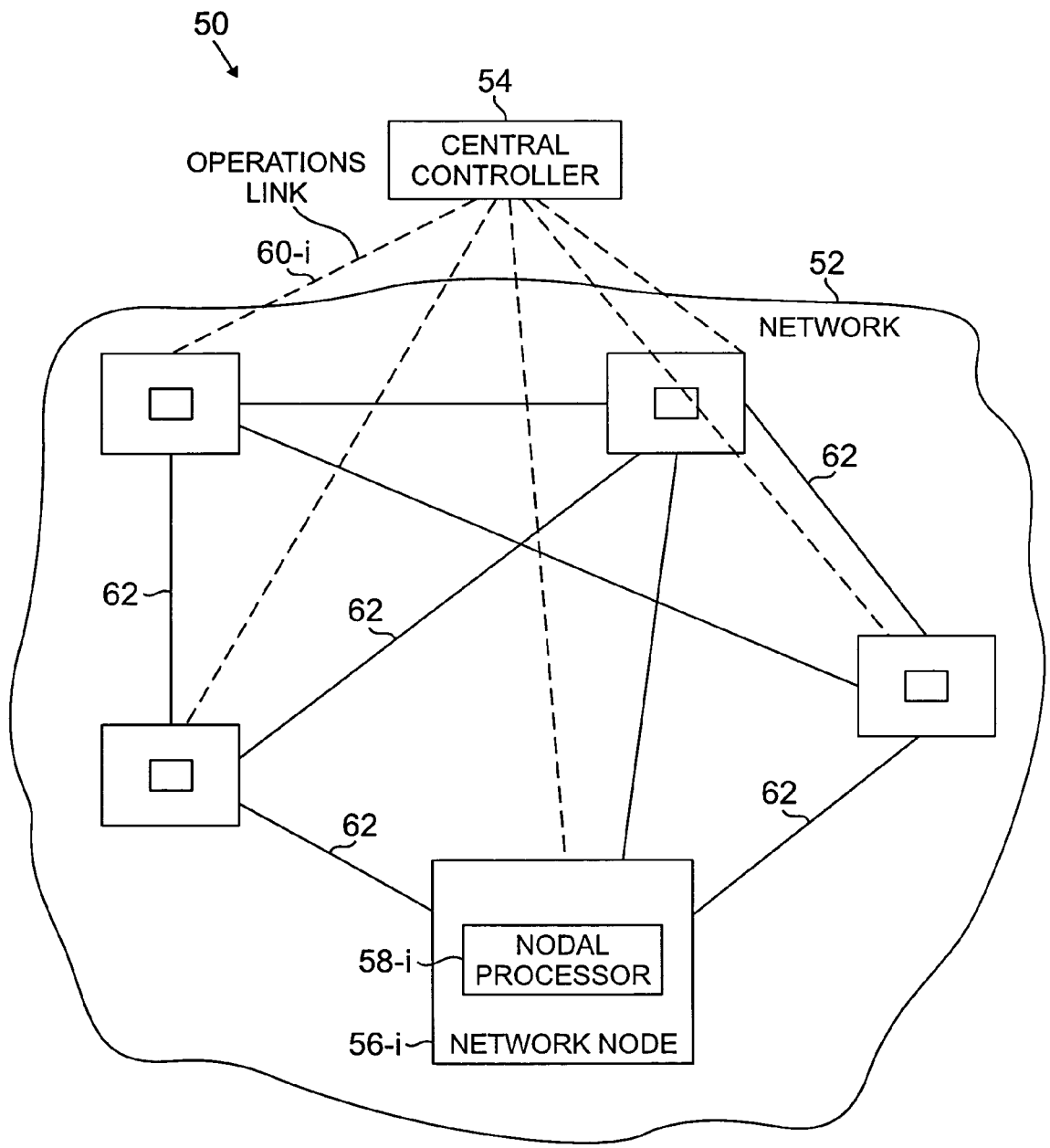
FIG. 3 shows an example network-based system in which the maximum-flow based precomputation algorithm of FIG. 2 is implemented.

FIG. 3 shows an exemplary network-based system 50 in which the maximum-flow precomputation algorithm can be implemented in a centralized or distributed manner. The system 50 includes a network 52 and a central controller 54.

The network 52 may comprise, by way of example, an Internet protocol (IP)-optical wavelength division multiplexed (WDM) mesh network configured for carrying MPLS data traffic, although the invention may be utilized with any type of network. The network 52 includes a number of nodes 56-$i$, i=1, 2, ... N. Each of the nodes 56-$i$ includes a corresponding nodal processor 58-$i$. The nodes 56-$i$ of network 52 are interconnected by, for example, optical fiber connections 62. In this example, each of the nodes 56-$i$ has a fiber connection to three other nodes. Each of the nodes 56-$i$ is also connected to the central controller 54 via a corresponding operations link 60-$i$, shown as a dashed line in FIG. 3.

The central controller 54 and nodes 56-$i$ may each represent a computer, server, router, gateway or other suitable digital data processor programmed to provide the route precomputation techniques described herein.

It should be noted that the system of FIG. 3 is considerably simplified for purposes of illustration. The invention is well-suited for use in large-scale regional, national and international networks which may include many subnetworks, each having hundreds of nodes.

The central controller 54 may or may not participate in route precomputation, depending upon the particular implementation. For example, a fully distributed implementation need not utilize the central controller 54.

Figure 4:
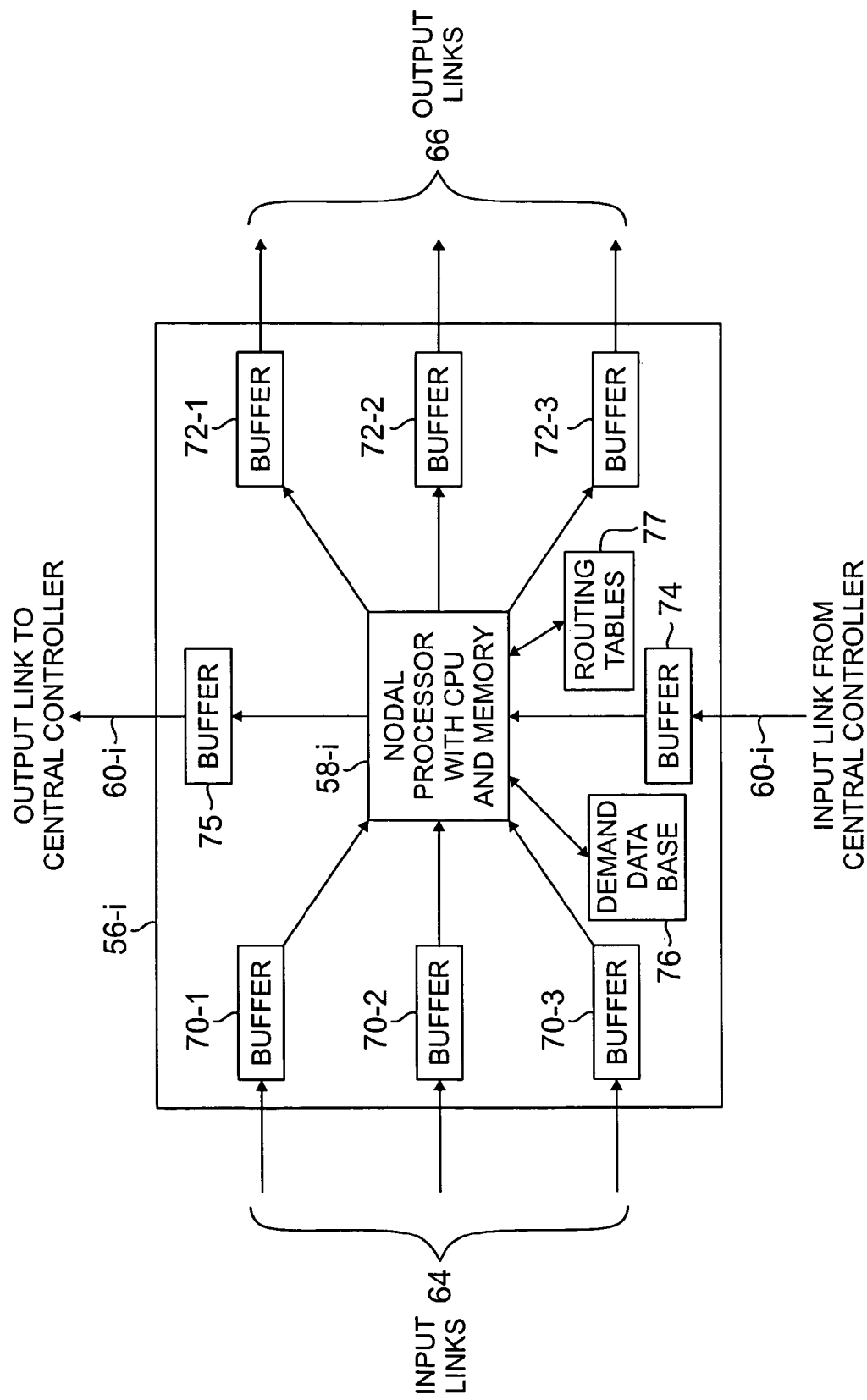
FIGS. 4 and 5 show different possible implementations of a given network node in the FIG. 3 system.

FIG. 4 shows one of the nodes 56-$i$ of network 52 in greater detail. The node 56-$i$ includes a nodal processor 58-$i$ which includes a central processing unit (CPU) and memory. A set of input links 64, corresponding to fiber connections 62 with three other nodes, are connected to buffers 70-1, 70-2 and 70-3 in node 56-$i$. The node 56-$i$ supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical conversion for signals received on input links 64, while the buffers 72-1, 72-2 and 72-3 may provide electrical-to-optical conversion for signals to be transmitted on output links 66.

The operational link 60-$i$ of node 56-$i$ to the central controller 54 includes an input operational link which is coupled to nodal processor 58-$i$ via an input buffer 74, and an output operational link which receives signals from nodal processor 58-$i$ via an output buffer 75. The node 56-$i$ also includes a demand database 76 for storing demands for network capacity, and a set of routing tables which specify routing routes through the network for particular demands. The demand database 76 and routing tables 77 may be components of a common memory within node 56-$i$, and may be combined with or otherwise associated with the memory of nodal processor 58-$i$. The node 56-$i$ has been simplified for purposes of illustration, and as noted above may include a substantially larger number of input and output links, as required for a given application.

Figure 5:
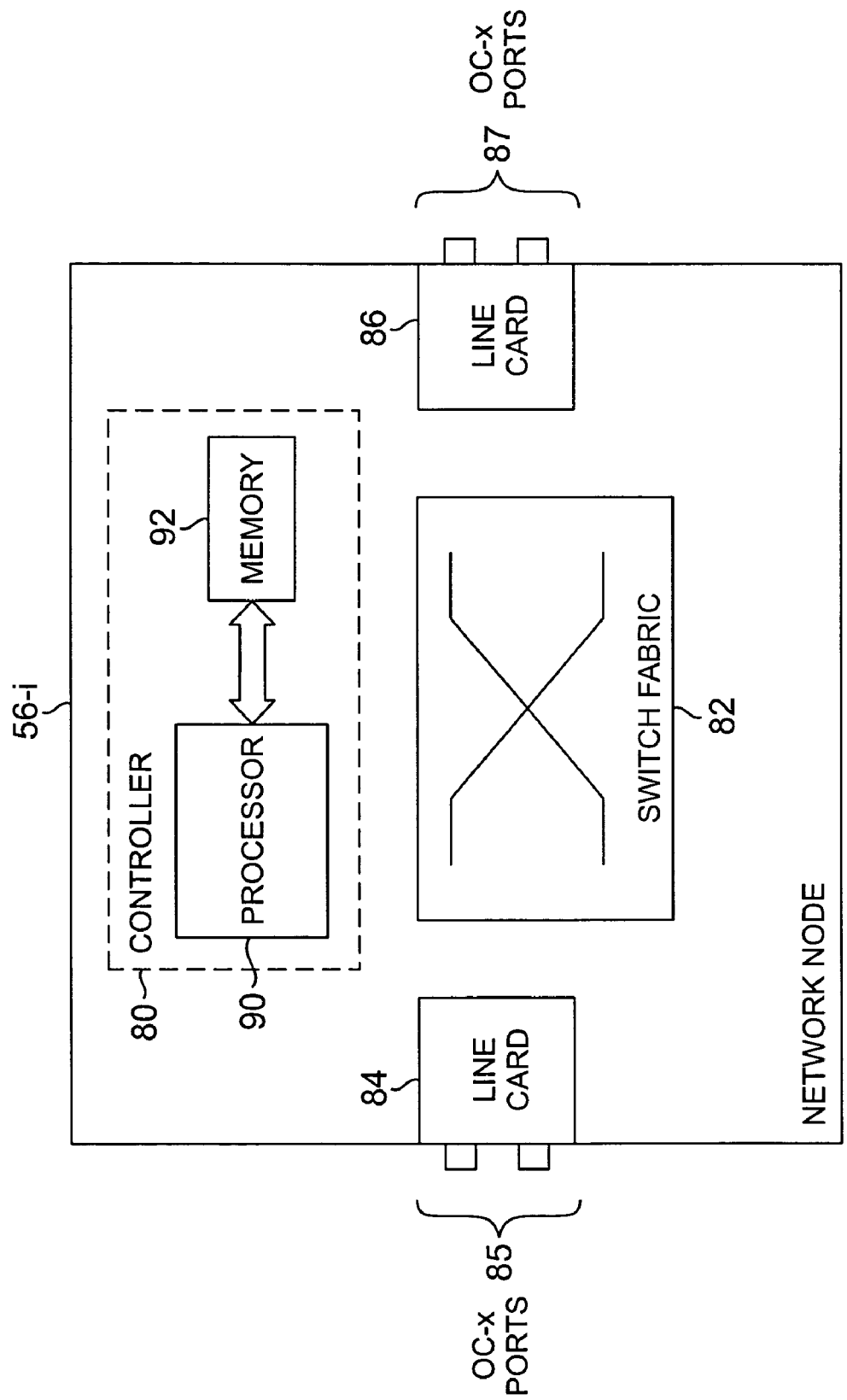

FIG. 5 shows another exemplary implementation of a given one of the network nodes 56-$i$ of the FIG. 3 network-based system.

It should be noted that the node implementation of FIG. 5 represents a type of optical cross-connect, and that the particular example maximum-flow based precomputation algorithm of FIG. 2 may not be directly applicable to a network which comprises a large number of such elements. This is because an optical cross-connect of the type illustrated generally requires that all of the data coming in on a given input port of a network node be transmitted via only a single output port of that node. However, many currently available maximum-flow algorithms assume that data coming in on a given input port of a network node can be transmitted on multiple output ports of that node, which is the case, for example, in a conventional IP router. Therefore, the FIG. 2 algorithm as described above is directly applicable to optical cross-connect nodes if utilized with a maximum-flow algorithm that is designed to handle optical cross-connects without the routing problem becoming intractable, or if the optical cross-connects are configured so as to permit routing of data from one input port to multiple output ports.

The network node 56-$i$ in this example includes a controller 80, a switch fabric 82, a first line card 84 having a set of OC-x ports 85 associated therewith, and a second line card 86 having a set of OC-x ports 87 associated therewith. It should be understood that the node 56-$i$ has again been simplified for purposes of illustration. For example, the node 56-$i$ as shown in FIG. 5 may in practice include a substantially larger number of line cards and ports, as required for a given application.

The controller 80 includes a processor 90 and a memory 92. The processor 90 may be, e.g., a microprocessor, a microcontroller, an application-specific integrated circuit (ASIC) or other type of processing device, as well as portions or combinations of such devices. The memory 92 may include an electronic random access memory (RAM), a read-only memory (ROM) or other type of storage device, as well as portions or combinations of such devices. The memory 92 may be used to store a demand database for storing demands for network capacity, and a set of routing tables which specify routes through a corresponding network for particular demands, with the routes being determined at least in part using the maximum-flow based precomputation algorithm of the present invention.

As indicated previously, the node 56-$i$ may be an element of an optical network or other type of network which includes a very large number of nodes, and possibly a central controller. One or more of the nodes and the central controller may each represent a computer, processor-based switch or other type of processor-based device configured to provide the route precomputation techniques described herein.

The implementations described in conjunction with FIGS. 3, 4 and 5 are presented by way of example, and it is to be appreciated that the invention can be implemented in numerous other applications.

For example, the invention can be implemented in an otherwise conventional cross-domain network management and traffic engineering system for use in an IP-optical WDM mesh version of the network 52. Such a system generally provides routing, restoration and provisioning tools for data traffic and optimization intelligence for the IP and optical layers, in a manner well-understood in the art.

It should be noted that references herein to minimization or maximization should not be construed as requiring any absolute minimum or maximum, respectively. For example, a "maximum-flow algorithm" as that term is used herein need not necessarily provide as an output any particular absolute maximum value.

The above-described embodiments of the invention are intended to be illustrative only. For example, any of a number of different maximum-flow algorithms and route selection algorithms may be used in the respective route generation and route selection stages of a maximum-flow based precomputation algorithm in accordance with the invention. More specifically, the SWP algorithm used in the route selection stage of the FIG. 2 embodiment may be replaced with any of a number of known routing algorithms. Also, a precomputation algorithm in accordance with the invention may include phases other than those explicitly shown in FIG. 2, such as an online route selection phase following offline route generation and offline route selection phases. In addition, the particular inputs, outputs, sets of information, and processing steps shown in the FIG. 2 embodiment may be varied to accommodate the particular needs of a given application. Furthermore, the precomputation techniques may be applied to any routing application, without regard to the type, arrangement or configuration of the network, network nodes, or communication protocols. For example, although illustrated in the context of ingress-egress node pairs, the techniques are more generally applicable to any network node pair(s).

These and numerous other alternative embodiments within the scope of the following claims will be readily apparent to those skilled in the art.

We claim:

1. A method of determining one or more routes between at least a given pair of nodes in a network utilizing a route precomputation algorithm having at least a route generation phase and a route selection phase, the method comprising the steps of:

applying in the route generation phase a maximum-flow algorithm to a first set of information characterizing links between the given pair of nodes in the network, the output of the maximum-flow algorithm being utilizable to generate a second set of information characterizing corresponding admissible flows; and determining in the route selection phase the one or more routes based on the second set of information.

2. The method of claim 1 wherein the applying and determining steps are repeated for each of a plurality of node pairs of the network.

3. The method of claim 1 wherein the applying step computes a maximum flow from a first one of the given pair of nodes to a second one of the given pair of nodes utilizing the maximum-flow algorithm.

4. The method of claim 3 wherein an admissible flow graph is generatable from the computed maximum flow by setting edge capacities in a corresponding network graph to flow values determined from the computed maximum flow.

5. The method of claim 1 wherein the determining step generates a designated maximum number k of routes that are incrementally consistent with one another.

6. The method of claim 1 wherein the determining step utilizes a shortest widest path (SWP) algorithm to determine the one or more routes based on the second set of information.

7. The method of claim 1 wherein the first set of information is representable as a graph comprising vertices corresponding to network nodes and edges corresponding to links between the nodes.

8. The method of claim 1 wherein the second set of information is representable as an admissible flow graph.

9. The method of claim 8 wherein the admissible flow graph is configured such that any route therethrough will not cause flow constriction.

10. The method of claim 1 wherein the applying and determining steps are configured so as to maintain flow scalability for the determined routes.

11. The method of claim 1 wherein the applying and determining steps are configured such that a set of k+i generated routes has substantially the same route quality regardless of whether the routes are generated collectively as k+i routes or the routes are generated by first generating k routes and subsequently generating i additional routes.

12. The method of claim 1 wherein the route generation phase and the route selection phase are each implemented as corresponding offline phases of a multiple-phase precomputation algorithm.

13. The method of claim 12 wherein the multiple-phase precomputation algorithm further includes an online route selection phase in which a particular one of a plurality of routes determined in the offline route selection phase is selected for use in satisfying a particular traffic demand.

14. The method of claim 1 further comprising the step of storing information specifying each determined route and an associated permissible bandwidth that can be routed along that route.

15. The method of claim 1 wherein the network comprises a multi-protocol label switched (MPLS) data network.

16. The method of claim 1 wherein the determined one or more routes are utilizable to route a transmission demand comprising a label switched path (LSP) request defined by a tuple $(s_i, d_i, b_i)$ where $s_i$ and $d_i$ refer to ingress and egress nodes, respectively, of the network and $b_i$ denotes bandwidth required by the demand.

17. The method of claim 1 wherein the determined one or more routes are utilizable to route bandwidth guaranteed traffic.

18. The method of claim 1 wherein the applying and determining steps are implemented at least in part in a central controller of a network-based system.

19. An apparatus for use in determining one or more routes between at least a given pair of nodes in a network, the apparatus comprising:

a processor; and a memory coupled to the processor;

wherein the processor is operative to control execution of a route precomputation algorithm having at least a route generation phase and a route selection phase;

wherein in the route generation phase a maximum-flow algorithm is applied to a first set of information characterizing links between the given pair of nodes in the network, the output of the maximum-flow algorithm being utilizable to generate a second set of information characterizing corresponding admissible flows; and wherein in the route selection phase one or more routes are determined based on the second set of information.

20. A computer-readable medium encoded with one or more programs for use in determining one or more routes between at least a given pair of nodes in a network, utilizing a route precomputation algorithm having at least a route generation phase and a route selection phase, the one or more programs when executed implementing the steps of:

applying in the route generation phase a maximum-flow algorithm to a first set of information characterizing links between the given pair of nodes in the network, the output of the maximum-flow algorithm being utilizable to generate a second set of information characterizing corresponding admissible flows; and determining in the route selection phase the one or more routes based on the second set of information.

* * * * *